United States Patent [19]

Maeda et al.

[11] Patent Number: 5,353,265
[45] Date of Patent: Oct. 4, 1994

[54] MAGNETO OPTICAL OVERWRITING METHODS USING A SINGLE OPTICAL HEAD DESIGNED FOR A TWO-BEAM OVERWRITE

[75] Inventors: Miyozo Maeda, Atsugi; Yuji Inouye, Kawasaki; Yasunobu Hashimoto, Sagamihara; Ken-ichi Itoh, Yamato; Seiya Ogawa, Kawasaki, all of Japan

[73] Assignee: Fujitsu Limited, Kawasaki, Japan

[21] Appl. No.: 476,588

[22] Filed: Feb. 7, 1990

Related U.S. Application Data

[62] Division of Ser. No. 264,906, Oct. 31, 1988, Pat. No. 5,144,601.

[30] Foreign Application Priority Data

Nov. 2, 1987 [JP] Japan .................. 62-275637
Nov. 2, 1987 [JP] Japan .................. 62-275638
Dec. 28, 1987 [JP] Japan .................. 62-330132

[51] Int. Cl.$^5$ ................ G11B 13/04; G11B 11/12
[52] U.S. Cl. ......................... 369/13; 360/114
[58] Field of Search ............. 369/13, 14; 360/59, 360/114; 365/122

[56] References Cited

U.S. PATENT DOCUMENTS

| | | | |
|---|---|---|---|
| 4,799,208 | 1/1989 | Satoh et al. | 369/100 |
| 4,816,385 | 3/1989 | Gravesteijn et al. | 430/495 |
| 4,855,975 | 8/1989 | Akasaka et al. | 360/59 |
| 4,882,718 | 11/1989 | Kryder et al. | 365/122 |
| 4,888,750 | 12/1989 | Kryder et al. | 360/57 |
| 5,020,040 | 5/1991 | Lee | 360/59 |
| 5,130,958 | 7/1992 | Fukami et al. | 369/13 |

FOREIGN PATENT DOCUMENTS

| | | | |
|---|---|---|---|
| 61-190740 | 8/1986 | Japan | 369/13 |
| 61-190741 | 8/1986 | Japan | 369/13 |

*Primary Examiner*—Hoa T. Nguyen
*Attorney, Agent, or Firm*—Staas & Halsey

[57] ABSTRACT

A method for overwriting information in a magneto-optical memory medium which includes a simultaneous writing and erasing step of continuously irradiating a written information-carrying area of the recording layer of the memory medium with two different pulses from a single laser beam head in accordance with information to be written, regardless of the presence or absence of written information. A variation includes irradiating the written information-carrying area with an erasing pulse from a laser beam head, regardless of the presence or absence of written information, and then selectively irradiating the information-erased area with a writing pulse from another laser beam head in accordance with information to be written. According to these methods, it becomes possible to carry out a simple and high-speed overwriting with an increased and stabilized bit positioning accuracy.

10 Claims, 13 Drawing Sheets

Fig. I(A) PRIOR ART
WRITE
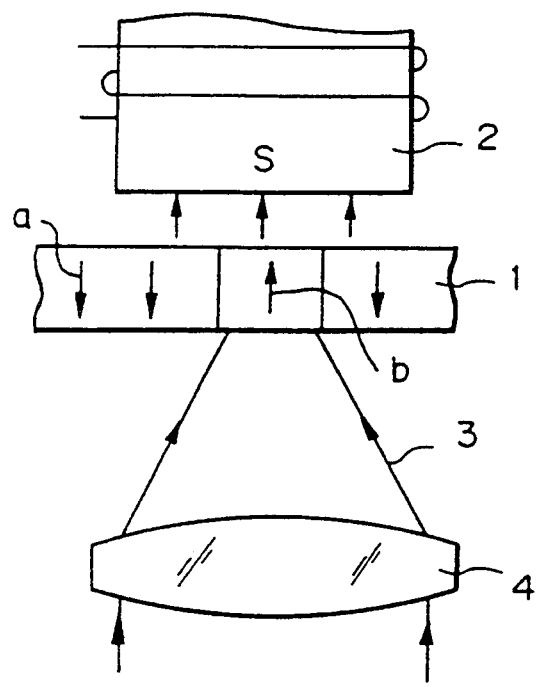
Fig. I(B) PRIOR ART
ERASE
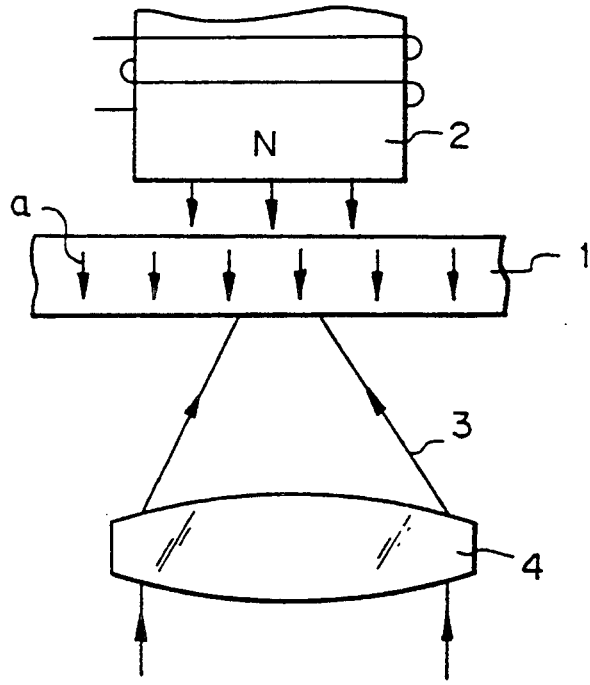

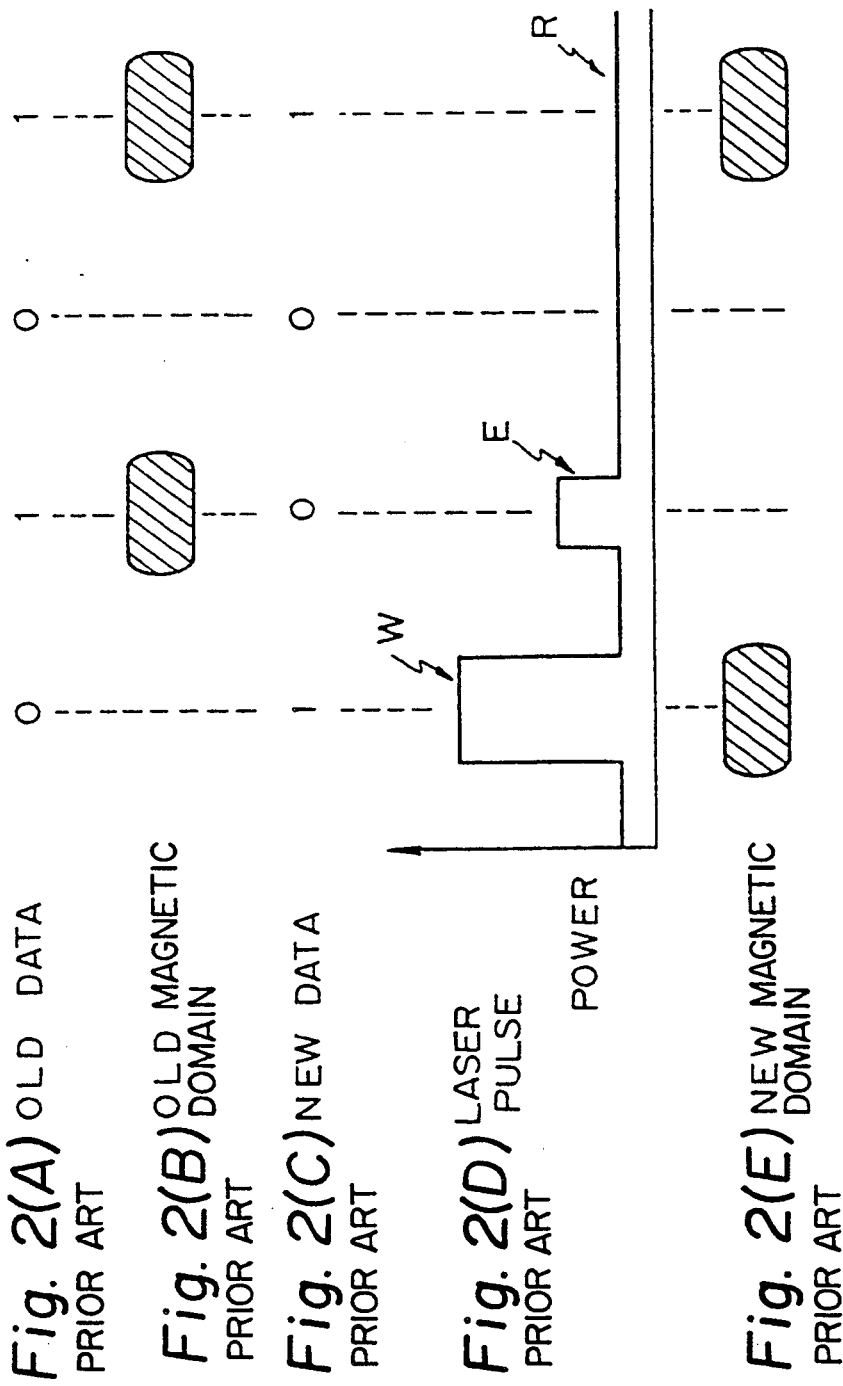

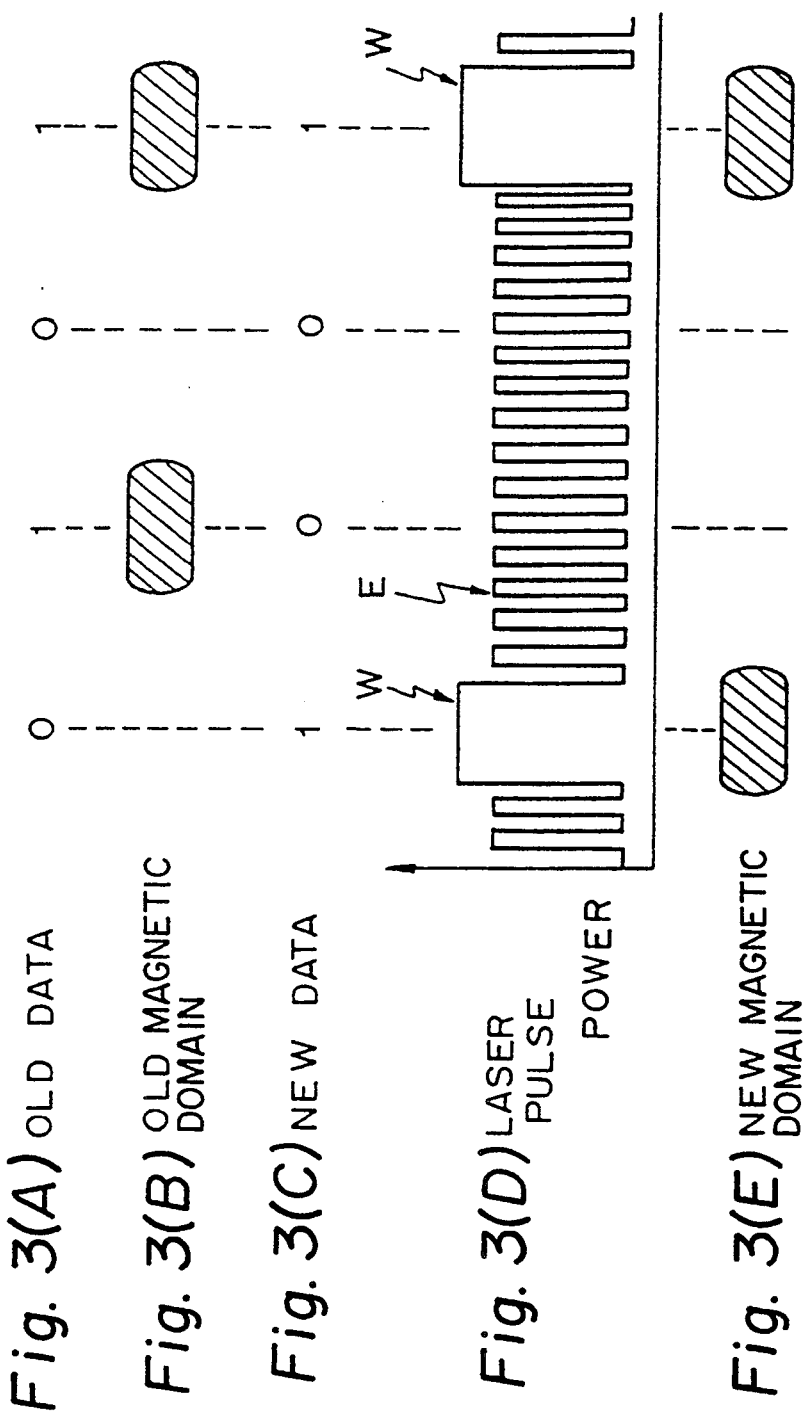
Fig. 3(A) OLD DATA
Fig. 3(B) OLD MAGNETIC DOMAIN
Fig. 3(C) NEW DATA
Fig. 3(D) LASER PULSE POWER
Fig. 3(E) NEW MAGNETIC DOMAIN

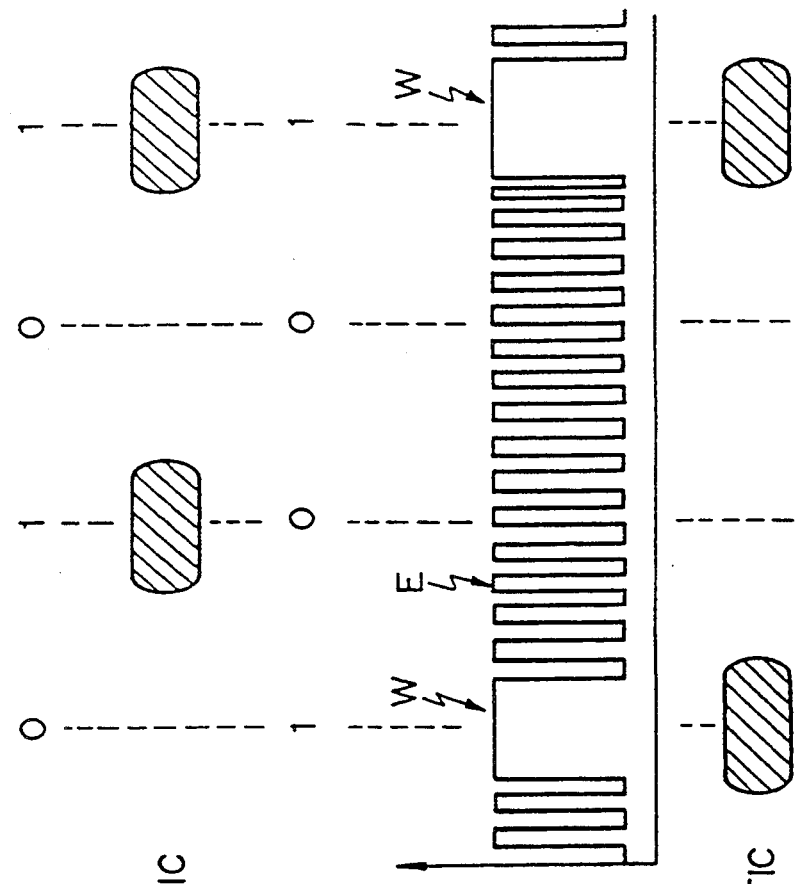
Fig. 4(A) OLD DATA
Fig. 4(B) OLD MAGNETIC DOMAIN
Fig. 4(C) NEW DATA
Fig. 4(D) LASER PULSE POWER
Fig. 4(E) NEW MAGNETIC DOMAIN

RECORDING CHARACTERISTIC

ABILITY TO REPEAT WRITE AND ERASE

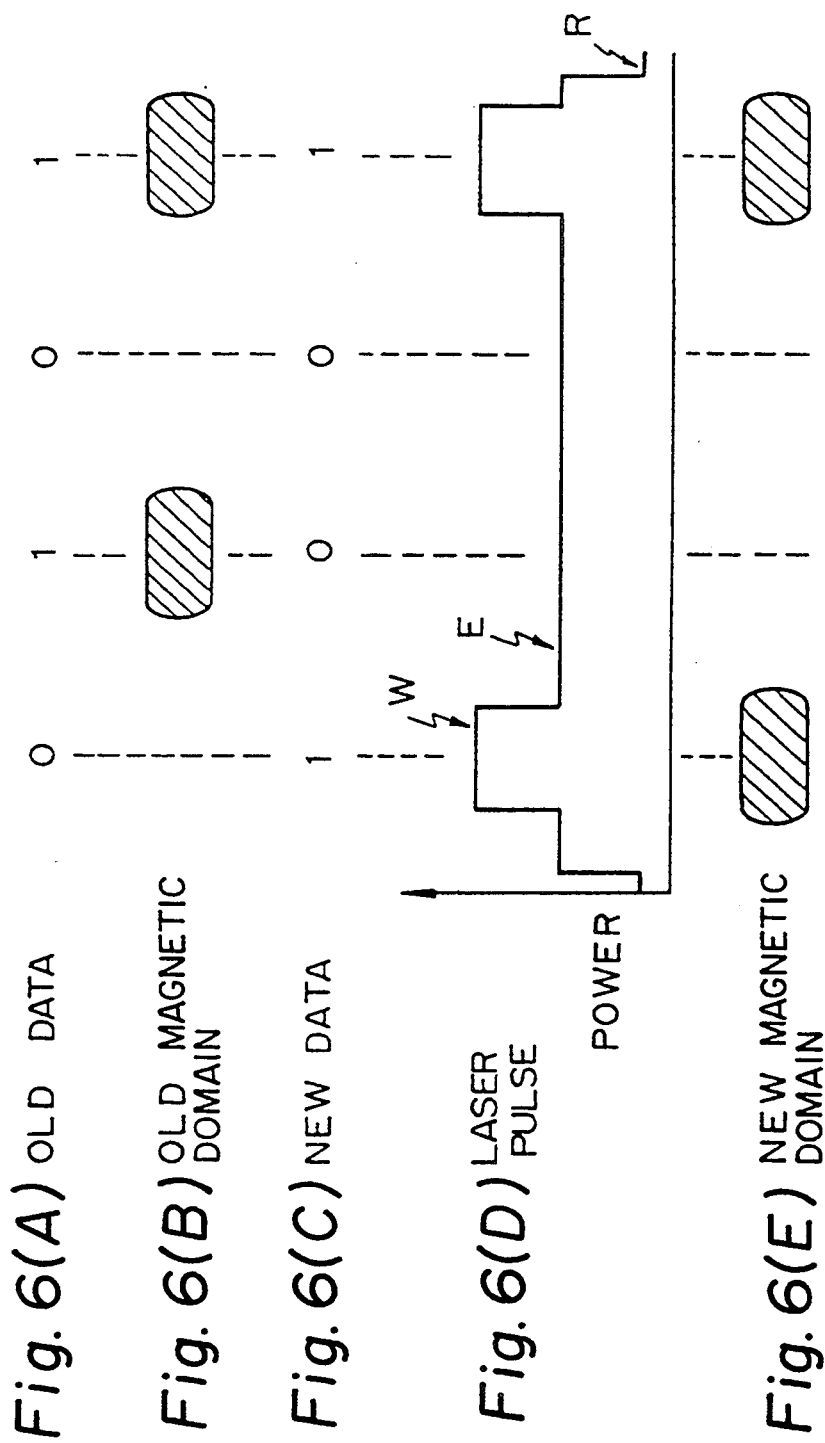

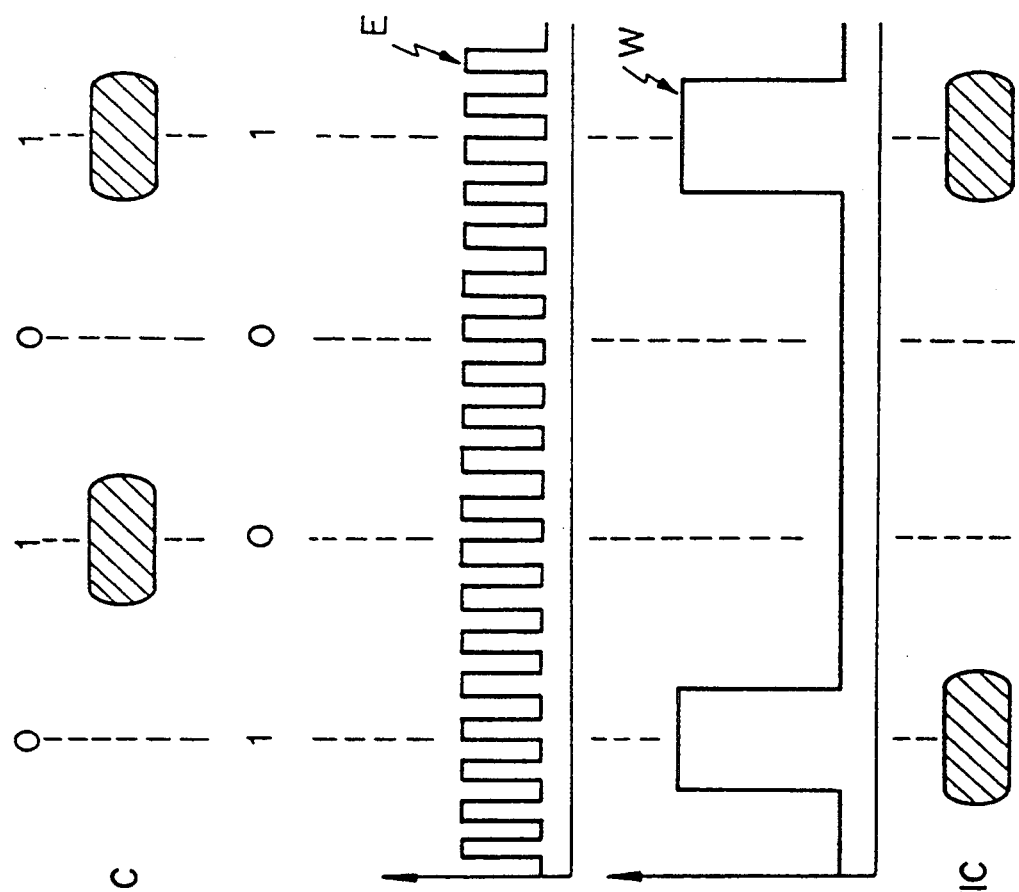

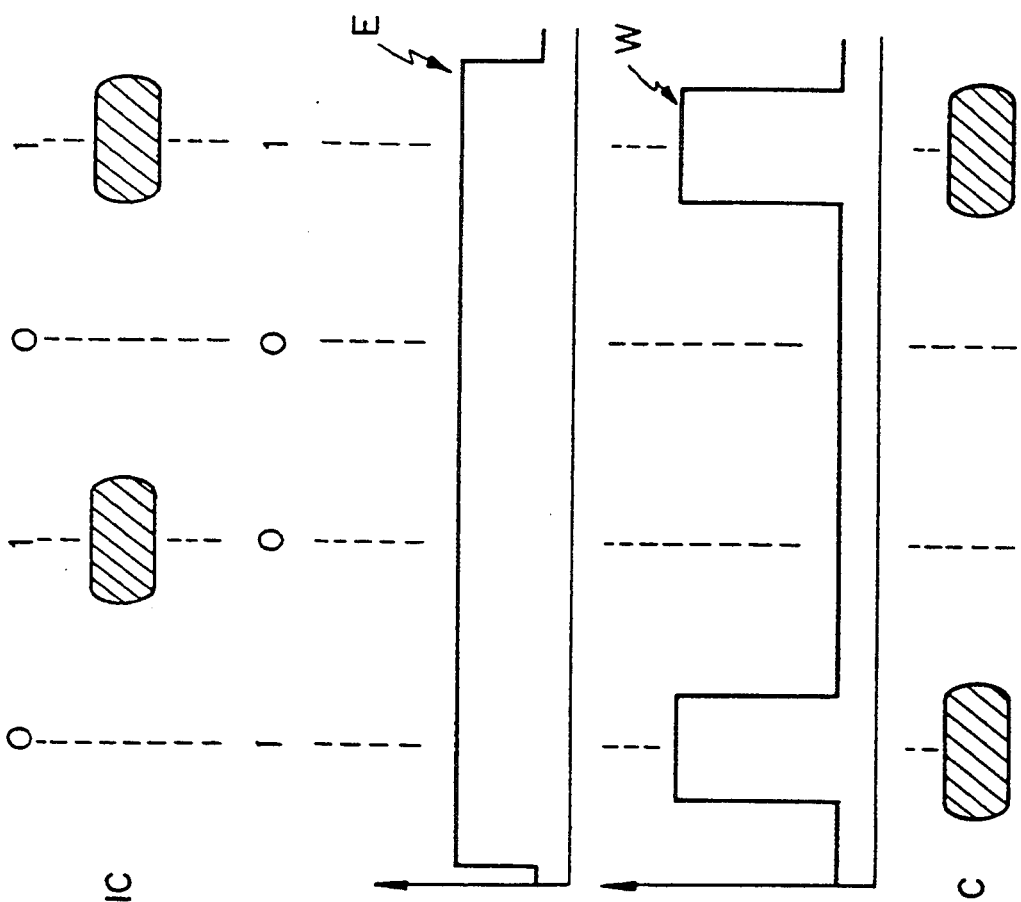
Fig. 9(A) OLD DATA
Fig. 9(B) OLD MAGNETIC DOMAIN
Fig. 9(C) NEW DATA
Fig. 9(D1) LASER PULSE (ERASE)
Fig. 9(D2) LASER PULSE (WRITE)
Fig. 9(E) NEW MAGNETIC DOMAIN

ERROR RATE AFTER OVERWRITE

MAGNETO OPTICAL OVERWRITING METHODS USING A SINGLE OPTICAL HEAD DESIGNED FOR A TWO-BEAM OVERWRITE

This application is a divisional of application Ser. No. 07/264,906, filed Oct. 31, 1988, now U.S. Pat. No. 5,144,601.

BACKGROUND OF THE INVENTION

1. Field of the Invention

The present invention relates to a magneto-optical recording method. More particularly, it relates to a method for overwriting information in a magneto-optical memory medium such as magneto-optical disks. An overwriting of information is a rewriting of information or data already written in areas or tracks of the recording layer of the medium. According to the method of the present invention, new information can be overwritten on information already written in the recording layer by a relatively simple and easy process and at a high speed.

2. Description of the Related Art

Due to their excellent recording characteristics, such as high recording density and large memory capacity, rewritable or overwritable magneto-optical disks are widely used as document files and other memory media. Generally, the magneto-optical disks comprise a substrate such as glass or a plastic resin coated with a layer of magneto-optical recording material such as a metal alloy.

In the prior art magneto-optical disks, the writing, reading and erasing of information are generally carried out as follows:

Writing or Recording Information

As illustrated in FIG. 1(A), the prior art magneto-optical disk device comprises a disk 1, a magnet 2 used to provide an outer magnetic field, and a lens 4 providing a focused laser beam. To simplify understanding of the magnetization in the recording layer of the disk 1, the disk 1 is illustrated as a single layer.

During operation, first the directions of the magnetization in the recording layer of the disk 1 are adjusted to be in the same direction (see, arrors "a" in disk 1 of FIG. 1(B)). A high power writing laser beam 3, as shown in FIG. 1(A), is irradiated onto a selected area of the recording layer to heat that area to a temperature higher than the Curie temperature or compensation temperature of the material constituting the recording layer. Because of the presence of an outer magnetic field produced by the magnet 2, the heated area of the recording layer changes its direction of magnetization to that of the outer magnetic field (see, arror "b" in the disk 1 of FIG. 1(A)), and thus two directions of magnetization "a" and "b" are generated in the disk 1. Accordingly, the information or data is written as binary signals "0" and "1" corresponding to a downward magnetization "a" and an upward magnetization "b", respectively.

Reading Information

The written information "0" and "1" can be read by irradiating the information-carrying disk with a low power reading laser beam. When the laser beam is reflected on the surface of the disk, a magneto-optic Kerr effect occurs in the reflected laser beam, due to the above magnetization. Thus a polarization of the reflected beam is changed, i.e., a plane polarization of the beam is rotated. This rotation of the polarization plane is determined by a detecting device to thereby read the written information "0" and "1". The detecting device is, for example, a photodetector provided in the reading head.

Erasing Information

Erasing can be carried out, for example, as shown in FIG. 1(B). Namely, a high power erasing laser beam 3 is irradiated onto the disk 1, and as a result, the direction of magnetization in the disk 1 is changed as shown by the arrors "a". At this stage, the magnet 2 exhibits an outer magnetic field opposite to that exhibited by the magnet during writing. As can be seen, the magnetization direction is now the same as that at the initial stage, and therefore, the erasing of information is also referred to herein as "initialization".

The above-described magneto-optical recording method is disadvantageous in that, since the magnetization direction of the disk can be changed only in the area onto which a high power laser beam is irradiated, to rewrite written information or data, the old data must be first erased and then new data written in the same area of the recording layer. As is easily understood, this means that at least two revolutions of the disk are necessary to carry out such rewriting or overwriting in the prior art magneto-optical disks. Also, it should be noted that the writing speed is greatly reduced due to this excessive rotation of the disk.

To obtain a high-speed writing of information, several overwriting methods have been suggested. For example, Japanese Unexamined Patent Publication (Kokai) No. 59-113506 teaches a magneto-optical rewriting method in which the power of laser beam to be irradiated onto an information-carrying area of the recording medium (consisting of a magnetic coating having a perpendicular magnetic anisotropy) is modified depending upon new information to be written. Japanese Unexamined Patent Publication (Kokai) No. 59-113507 teaches a similar rewriting method but, in this method, an outer magnetic field of a constant strength is additionally applied to the recording medium during rewriting. The application of this outer magnetic field is particularly effective in relaxing the restrictions on the magnetic coating to be used. In addition, *Appl. Phys. Lett.*, 49 (8) 473 (1986), which will be described hereinafter with reference to FIG. 2, also teaches a similar overwriting method utilizing a diamagnetism of the magnetic coating as the recording medium.

In the overwriting method of *Appl. Phys Lett.*, new data to be written is first compared with the old data written on the recording medium. Then, based on the results of comparison, the new data is written on the medium after an exact positioning of laser beams for writing and erasing. More particularly, the recording medium is first sequentially checked or observed to ascertain whether or not an (old) remaining magnetic domain which corresponds to old data or a signal "1" is present in a recording track. If a magnetic domain exists, and if a signal "1" is not required in the new data, an erasing beam is then focused on a center portion of the remaining magnetic domain to remove same. Conversely, if a signal "1" is required, the erasing beam is not irradiated, and the remaining magnetic domain showing the signal "1" is maintained. On the other hand, when an old magnetic domain does not exist, and if a signal "1" is no longer required in the new data, no action is taken. If the signal "1" is to be written, a writing beam is then focused on a selected site to form a new magnetic domain corresponding to the signal "1".

The above-described overwriting method is illustrated briefly in FIG. 2. As shown in FIG. 2, a line (A) shows old data or information signals "0" and "1" on the recording medium, a line (B) shows a distribution of magnetic domains (old magnetic domains) formed on the recording medium in conformity with the signal "1" of the old data line (A), a line (C) shows new data to be written on the recording medium in place of the old data of the line (A), a line (D) shows a pulse pattern of a laser beam applied to the recording medium to overwrite the old data of the line (A), and a line (E) shows a distribution of new magnetic domains formed on the recording medium by the irradiation of the pulsed laser beam. Note, the above explanation also is applicable to FIGS. 3, 4, 6, 8, and 9. To simplify understanding, the old data in the line (A) and the new data in the line (C) are the same in all of the drawings.

Referring now to FIG. 2, it can be seen that, to erase the old signal "1" or magnetic domain, a weak erasing pulse E, which is stronger than a reading power level R, is irradiated onto a center portion of the magnetic domain. Note, during overwriting, no reading is conducted and therefore the power level R in FIG. 2 is intended to explain a power level of the erasing pulse E compared with that of the power level for reading. However, the above action is not taken when such an old signal is to be replaced by new signal "1" in the new data. Namely, to write a new signal "1", a stronger writing pulse W is irradiated onto a predetermined site of the track of the recording medium to form a new magnetic domain. In this overwriting method, the presence of the old signal "1" or magnetic domain is ascertained by scanning another laser beam before using the laser beam for writing and erasing. Since the erasing pulse is concentrated on the center portion of the magnetic domain, another small bubble is produced in a central portion of the already-made bubble, and the magnetic domain is erased by the interaction between these bubbles.

The prior art overwriting methods described in Japanese Kokai Nos. 59-113506 and 59-113507, and in *Appl. Phys. Lett.*, and discussed above with reference to FIG. 2, increase the speed of overwriting in the magneto-optical disks, but have a drawback in that, prior to an overwriting or rewriting of information, the position of old information already written in the disk must be exactly detected. This detection of old information is cumbersome and time-consuming, and if an error occurs in this detection, such as a shift in the position of the old information, it is practically impossible to carry out a correct overwriting.

SUMMARY OF THE INVENTION

It is an object of the present invention to provide an improved method which enables an easy, simple and high-speed overwriting of information to be carried out in a magneto-optical memory medium such as a magneto-optical disk.

Another object of the present invention is to increase and stabilize the accuracy of positioning bits or pits.

Thus, according to the present invention, there is provided a method for overwriting information in a magneto-optical memory medium which comprises a substrate having a layer of magneto-optical recording material having a perpendicular magnetizing characteristic coated thereon. The method includes a simultaneous writing and erasing step of continuously irradiating a written information-carrying area of said recording layer with two different pulses of a laser beam from a single beam head, in accordance with information to be newly written, regardless of the presence or absence of written information in the area. One of said pulses has a power sufficient to carry out a writing operation and another one of the pulses has a power sufficient to erase written information, but not sufficient to carry out a writing operation, and is irradiated onto a whole portion of the area other than the portion in which information is to be written.

According to the present invention, there is also provided a method for overwriting information in a magneto-optical memory medium which comprises a substrate having a layer of magneto-optical recording material having a perpendicular magnetizing characteristic coated thereon. The method includes a first step of an overall irradiation of a written information-carrying area of the recording layer with an erasing pulse of a laser beam from a beam head, regardless of the presence or absence of written information in the area. The erasing pulse has a power sufficient to erase written information but not sufficient to carry out a writing operation. A second step selectively irradiates the information-erased area of the recording layer with a writing pulse of a laser beam from another beam head in accordance with information to be written. The writing pulse has sufficient power to carry out a writing operation. Preferably, a frequeuency of the erasing pulse used is higher than that of the writing pulse. This overwriting method uses an optical head with two beams, and therefore, is called a two-beam overwrite method.

The magneto-optical overwriting methods of the present invention will be described hereinafter, in detail, with reference to the accompanying drawings.

BRIEF DESCRIPTION OF THE DRAWINGS

FIG. 1 is a schematic view of the writing and erasing stages in a prior art magneto-optical overwriting method;

FIG. 2 is a schematic view of an overwriting mechanism used in a prior art magneto-optical overwriting method;

FIG. 3 is a schematic view of an overwriting mechanism used in a preferred embodiment of the present invention;

FIG. 4 is a schematic view of a modification of the overwriting mechanism of FIG. 3;

FIG. 6 is a schematic view of an overwriting mechanism used in another preferred embodiment of the present invention;

FIG. 8 is a schematic view of an overwriting mechanism used in still another preferred embodiment of the present invention;

FIG. 9 is a schematic view of a modification of the overwriting mechanism of FIG. 8;

DESCRIPTION OF THE PREFERRED EMBODIMENTS

Figure 5:
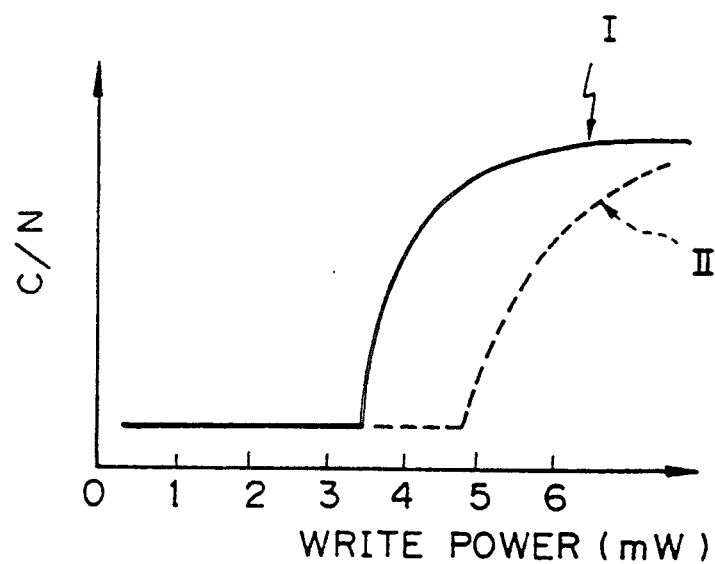
FIG. 5 is a graph of the recording characteristic observed in the overwriting mechanism of FIG. 3.

As described above, the magneto-optical overwriting method according to the present invention comprises a simultaneous writing and erasing step of continuously irradiating a written information-carrying area of the recording layer of the memory medium with two different pulses from a single laser beam head in accordance with the information to be written, regardless of the presence or absence of written information an erasing laser pulse is continuously irradiated between the irradiation of two writing laser pulses.

According to a preferred embodiment of the present method, the erasing pulse is a series of pulses which fill in the gaps between the two writing pulses, each of the series erasing pulses having a pulse width smaller than that of the writing pulses.

The above method is illustrated in FIG. 3, in which the lines (A), (B), (C) and (E) correspond to the lines (A), (B), (C) and (E) of FIG. 2. The line (D), showing the pattern of the applied laser pulses, indicates that a writing laser pulse W is irradiated onto a site in which the new data or signal "1" is to be written, to form a new magnetic domain and an erasing slim laser pulse E is continuously irradiated, having a small pulse distance, on the recording area of the disk other than the sites on which new magnetic domains are formed.

According to this overwrite method, since a plurality of narrow-width pulses are irradiated as the erasing pulse, a complete erasing of old magnetic domains can be carried out, regardless of the presence or absence of old magnetic domains in the recording track. In addition, since a writing pulse is irradiated to form a magnetic domain at a predetermined site of the recording track, new information can be directly overwritten in the recording track regardless of the distribution of old magnetic domains. Thus, the prior art problem of adjustment of the position of this writing pulse to that of the preceding pulse, for detecting old magnetic domains, does not arise.

The inventors found that to obtain a reliable and complete erasure of old data, the frequency of the erasing pulse is preferably higher than that of the writing pulse used to form new magnetic domains conforming with the new data or signal "1". Preferably, the frequency of the erasing pulse is 3 times or more higher than a maximum frequency of the writing pulse. When an erasing pulse having such a higher frequency is used, at least one pulse will strike the magnetic domain to be removed, to reproduce a new signal "0".

In this overwrite method, the height of the erasing and writing pulses is not critical. Preferably, as shown in FIG. 3, the height of the erasing pulses E is less than that of the writing pulses W, or as shown in FIG. 4, the height of the erasing pulses E is the same as that of the writing pulses W. Note, although not shown, the height of the erasing pulses E may be higher than that of the writing pulses W if this does not adversely affect the operation.

According to another preferred embodiment of the present method, the erasing pulse is a continuous laser beam having a power stronger than that of a reading beam used and sufficient to erase written information, but not sufficient to carry out a writing operation. This embodiment is exemplified in FIG. 6. As shown in FIG. 6, the lines (A), (B), (C) and (E) correspond to the lines (A), (B), (C) and (E) of FIGS. 2 to 4. As shown by the line (D) of FIG. 6, a writing pulse W is irradiated onto a recording site of the track to write information therein. A continuous erasing pulse, or preferably a continuous beam E, is irradiated onto a non-recording site of the track to remove old magnetic domains and maintain the signal "0" if no old pits exist. As can be seen, the writing pulse W is a single discontinuous pulse, but the erasing pulse E is a continuous pulse or laser beam. Further, as in the method of FIGS. 3 and 4, the frequency of the erasing pulse E is higher than that of the writing pulse W, and preferably the frequency of the erasing pulse E is 3 times or more higher than a maximum frequency of the writing pulse W.

Referring again to FIG. 6, a pulsed beam W having sufficient power to write information is irradiated onto a site where new information or data, i.e., signal "1", is to be written. This irradiation of the pulsed beam W is carried out, regardless of the presence or absence of old information or magnetic domains at that site.

According to the recording method of the present invention, information is written or erased in the recording medium using a demagnetization phenomenon thereof in the absence of an external magnetic field (which may be present if a greater stabilization of the overwriting step is required, or for other purposes). Therefore, when the pulsed beam having a rewritable power is focused on a site of the recording track of the medium, two processes are carried out depending on the presence or absence of old information or magnetic domains at that site. If old magnetic domains do not exist, the pulsed beam will reverse the magnetic field in the irradiated site by demagnetization. This produces a new magnetic domain at that site. If an old magnetic domain does exist, the pulsed beam will not reverse the magnetic field in the irradiated site. Namely, an old magnetic domain found before the overwriting is retained as a new magnetic domain.

As shown in FIG. 6, an erasing pulse E in the form of a continuous laser beam is irradiated at a constant power level onto the recording track, except for the information recording site. The power of this erasing pulse E is sufficient to erase the old written information, but not sufficient to write new information, i.e., the pulse E is weaker than the pulse W. Note, although the pulse E has a power greater than that of a reading power level R, this does not have any practical effect on the written information. The power level R is indicated herein for comparison.

As described above, the erasing mechanism of the present method is based on the use of a continuous laser beam having an intermediate power, as defined herein, as an erasing pulse. The inventors found that if the laser beam used has a suitable intermediate power, when such a beam is used in the form of a continuous beam (not a pulsed beam) it will erase written information but will not cause undesirable writing in a non-recorded area of the track. That is, it is possible to erase written information by continuously irradiating a laser beam having a predetermined intermediate power onto the information-carrying track. As is obvious, this eliminates the difficult operation of exactly focusing the erasing beam in a control portion of the old magnetic domain to be removed. Note, in the method of the above-discussed *Appl. Phys. Lett.*, a small beam is selectively irradiated only onto a control portion of the old magnetic domain to be removed, but such a selective irradiation is very difficult, and therefore, is not widely used.

In the magneto-optical overwriting methods of the present invention, the recording medium is first initialized to forcibly magnetize the directions of magnetization of the medium in one direction, and after information is first written in the initialized medium, rewriting or overwriting is subsequently carried out. In principle, the overwriting of information is endlessly repeated once the initial writing is completed, but the initialization may be repeated at any stage of the working of the medium, if desired.

The preferred embodiments of the present invention as described above, teach that, according to the present invention, a plurality of narrow pulses are continuously applied (this application is not limited to sites carrying information to be erased), and therefore, the information can be erased regardless of the positioning accuracy. These embodiments also teach that a laser beam having a weak power can be applied to erase information without focusing the beam on a central portion of an information-carrying magnetic domain, and that if the power of this beam is increased, the beam can be used to write new information. Accordingly, overwriting can be easily and simply carried out at a high speed.

In addition to the one-beam overwrite method described above, the present invention provides a two-beam overwrite method which comprises a combination of a first step in which the written information-carrying area is irradiated overall with an erasing pulse from a laser beam head, regardless of the presence or absence of written information, and a second step in which the information-erased area is selectively irradiated with a writing pulse from another laser beam head in accordance with the information to be written. Note, the frequency of the erasing pulse is higher than that of the writing pulse.

In the overwriting method of the present invention, the erasing pulse has a frequency higher than that of the writing pulse. Preferably, the erasing pulse has a frequency 3 times or more higher than a maximum frequency of the writing pulse.

According to a preferred embodiment of the present method the erasing pulse comprises a series of pulses. Each pulse in the series of pulses has a width narrower than that of the writing pulse. This embodiment is exemplified in FIG. 8, which is substantially the same as FIG. 3 except for the addition of lines ($D_1$) and ($D_2$).

According to the illustrated embodiment, as shown in line ($D_1$), a narrow erasing pulse E as a first beam is continuously irradiated with a small distance between the pulses. Next, as shown in line ($D_2$), a writing pulse W is irradiated only on sites where information or a signal "1" is to be recorded.

As is easily understood, a reliable erasure of the information is obtained regardless of the presence or absence of old magnetic domains since a plurality of narrow pulses as the erasing beam are first irradiated along the track. After the removal of the old magnetic domains, a writing pulse is selectively irradiated onto the recording sites to directly overwrite or produce new magnetic domains regardless of the old magnetic domains and the distribution thereof. In this overwrite process, the control of irradiation positions, essential in the prior art process, becomes unnecessary.

Alternatively, according to another preferred embodiment of the present method, the erasing pulse is a continuous laser beam having a power stronger than that of a reading beam, and sufficient to erase written information, but not sufficient for writing. This embodiment is illustrated in FIG. 9, which is identical to FIG. 8 except that the pattern of the erasing laser pulse is changed.

As shown in line ($D_1$) of FIG. 9, the erasing pulse E is a continuous light beam, not a series of narrow pulses. This light beam has an intermediate power, and although it is not a pulsed laser, can completely erase written information, but it can not write new information.

After erasure of the old information, as shown in line ($D_2$) of FIG. 9, the writing pulse W is irradiated on sites of the track which correspond to new data or a signal "1" of the line (C) to write new information and thus produce new magnetic domains. The writing pulse W used herein has a power sufficient to write information.

The magneto-optical overwriting methods according to the present invention can use any magneto-optical memory medium such as a magneto-optical disk well-known in the art. The magneto-optical memory medium generally comprises a substrate or support such as glass, a plastic, a metal or alloy thereof, a semiconductor and the like. The substrate has at least a layer of magneto-optical recording material having a perpendicular magnetizing characteristic, such as a metals or alloy thereof, coated thereon.

Figure 10:
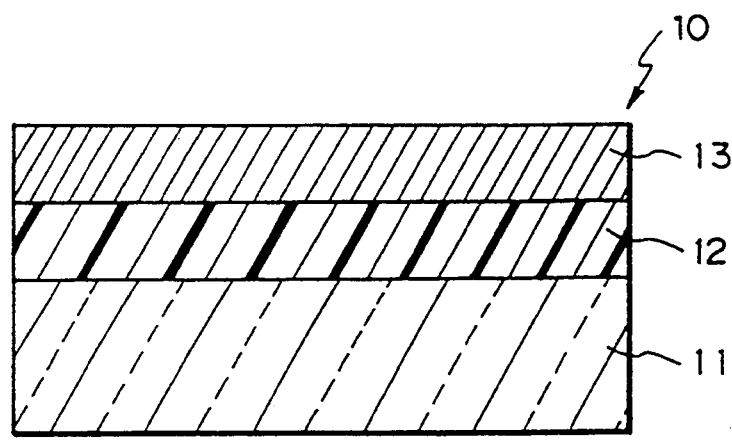
FIG. 10 is a cross-sectional view of the magneto-optical disk usable in the present invention.
Figure 11:
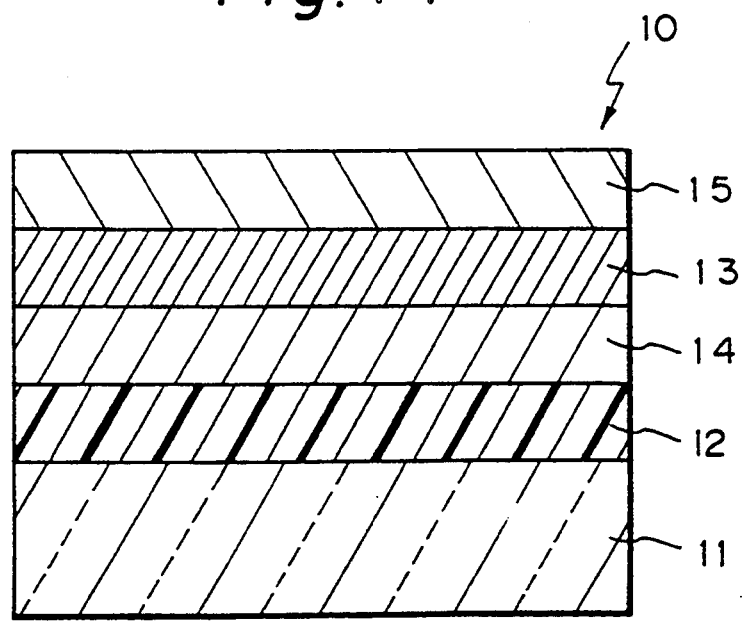
FIG. 11 is a cross-sectional view of a modification of the magneto-optical disk of FIG. 10.

For a further understanding of the present invention, two examples of magneto-optical disks are illustrated in FIGS. 10 and 11.

In FIG. 10, a magneto-optical disk 10 comprises a glass substrate 11 coated with, in this order, a pregrooved pattern layer 12 and a magneto-optical recording layer 13. The layer 12 with pregrooved patterns is made of a UV-hardenable resin (so-called "2P resin" or photopolymer) or an organic resin such as poly (methyl methacrylate), polycarbonate, and the like. The recording layer 13 is preferably made of an amorphous alloy of a rare earth metal-transition metal such as TbFeCo, GdFeCo, GdTbFe, GdDyFeCo and the like. These alloys have excellent recording characteristics, can be coated by, for example, sputtering or vacuum deposition, and can provide a uniform coating over a large area. In addition to these alloys other recording materials, for example, polycrystalline materials such as MnBi, MnCuBi and the like, or single crystal materials such as garnet and the like also may be used.

The magneto-optical disk of FIG. 10 may further include additional layers as shown in FIG. 11. For example, to protect the recording layer 13 from the affects of water or monomers in the underlying pregrooved pattern layer 12, a protective coating 14, usually called a primary coat, may be inserted between the layers 12 and 13. The protective coating 14 may be formed from materials such as $SiO_2$, $TiO_2$, ZnS, AlN and $Si_3N_4$. Further, to protect the recording layer 13 from the influence of water and other contaminants in the atmosphere, a protective overcoat 15 may be applied to a surface thereof. The overcoat 15 also may be formed from any material selected from the above-exemplified materials for the coating 14. Furthermore, the overcoat 15 may contain a lubricant impregnated therein to prevent damage to the disk 10 due to contact with an outer magnet for producing a magnetic field.

Figure 12:
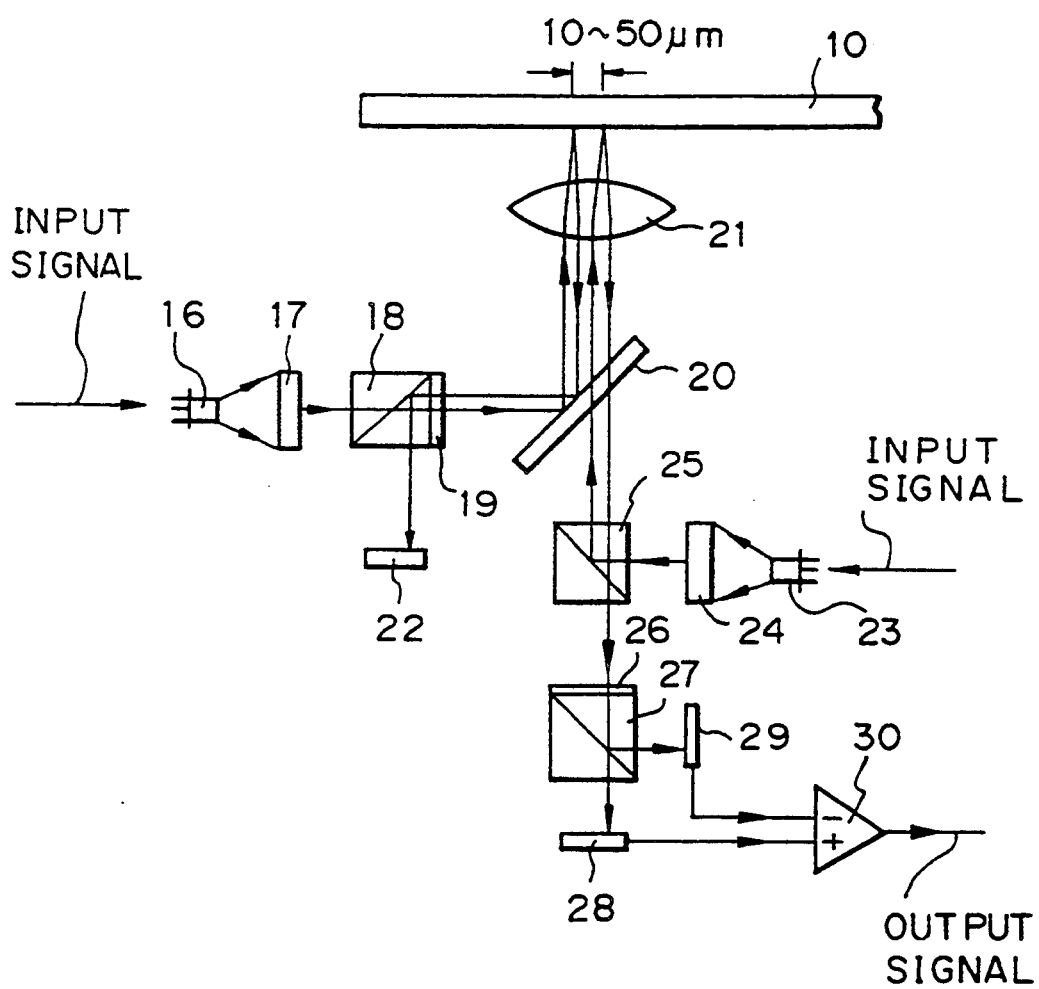
FIG. 12 is a schematic view of an optical head usable in the present invention.

In the present invention, an optical head illustrated in FIG. 12 may be used. In this connection, it should be noted that although the illustrated optical head is designed for a two-beam overwrite method, the optical head can be easily modified to be used in a one-beam overwrite method.

In FIG. 12, the magneto-optical disk 10 is rotated by a motor (not shown). The illustrated optical head is used in the two-beam overwrite method, and therefore, is provided with two semiconductor lasers 16 and 23. The first laser 16 emits a laser beam of 830 nm, and the second laser 23 emits a laser beam of 780 nm. An optical system including the first laser 16 and an optical system including the second laser 23 may be used for writing information and reading information, respectively, and vice versa.

A laser beam from the first laser 16 is transmitted to a collimator lens 17 upon receipt of an input signal, where it is changed to parallel beam. The parallel laser beam is sent to a polarization beam splitter 18 and is changed to circularly polarized light by a quarter wave plate 19 mounted therein. The light allowed to pass through the quarter wave plate 19 is reflected at a filter 20, passed through an objective lens 21, and finally focused on a recording layer (not shown) of the disk 10. The diameter of the spot produced by the focused light is less than 1 $\mu$m. Thereafter, reflected light is passed, in this order, through the objective lens 21, the filter 20, the quarter wave plate 19, and the beam splitter 18, and reaches a photodetector 22.

Another laser beam from the second laser 23 is first sent to a collimator lens 24, where the laser beam is changed to a parallel beam. The beam is then reflected at a half mirror 25, and the reflected beam passed through the filter 20 and focused in the objective lens 21. The focused beam is then irradiated onto the recording layer of the disk 10. A diameter of the spot produced is less than 1 $\mu$m, as in the optical system described above. Also, a distance between the beam spot from the first laser 16 and that from the second laser 23 is approximately 10 to 50 $\mu$m.

The beam reflected from the recording layer, as shown, is passed through the objective lens 21, filter 20 and half mirror 25, in that order, and then sent to a polarization beam splitter 27 provided with a half wave plate 26. Here, to improve the S/N ratio of the signals, the beam is separated into two components; a first component being sent to a photodetector 28, and a second component being sent to a photodetector 29. The signals from these photodetectors are combined in an analyzer 30, which then emits output signals. The optical head having this construction has an advantage in that two laser beams can be focused on the recording layer closely adjacent to each other.

Although not illustrated, the optical head may contain a servo mechanism or system for controlling the movement of the objective lens. Further, it may contain a means for producing the outer magnetic field, if desired.

The present invention will be described hereinafter with reference to examples thereof.

EXAMPLE 1

This is an example of the overwrite method shown in FIG. 3.

A cleaned and grooved glass substrate was sputtered to form a recording layer of $Tb_{24}Fe_{68}Co_8$ having a thickness of 100 nm.

Information was recorded or written in the initialized magneto-optical disk under the following conditions: distance between magnetic domains—2 $\mu$m, no outer magnetic field; rotation speed of disks—10 m/sec; writing power—5 mW. A C/N ratio of 43 dB was obtained.

Next, new information having a magnetic domain size of 1 $\mu$m and a distance between magnetic domains of 3 $\mu$m was overwritten on the information written in the above step. During this overwriting method, short laser pulses having a pulse width (pit length) of 0.2 $\mu$m as the erasing pulse, were repeatedly irradiated between the writing pulses. A satisfactory overwriting was attained with good results, i.e., a C/N ratio of 45 dB, an attenuation of magnetic domain signals (as described above, and a magnetic domain length or distance of 2 $\mu$m) of −34 dB.

FIG. 5 is a graph plotting the recording characteristic obtained. A solid curve I indicates the results for a magnetic domain length of 1 $\mu$m (frequency of 2.4 MHz) and a dotted line curve II shows the results for a magnetic domain length of 0.4 $\mu$m (frequency of 12 MHz). The curve II shows that writing cannot be carried out at a write power of approximately 4.8 mW or less, but that written information is erased at that power.

EXAMPLE 2

This is an example of the overwrite method shown in FIG. 6.

A cleaned and grooved glass substrate was sputtered to form a recording layer of $Tb_{24}Fe_{68}Co_8$ having a thickness of 100 nm, and a protective overcoat of $Si_3N_4$ was deposited on the recording layer.

Recording was carried out in accordance with the procedure described in Example 1, followed by overwriting in the manner described in line (D) of FIG. 6. That is, a writing pulse was irradiated on predetermined sites of the recording track to form new magnetic domains. In addition, a continuous beam or light having an intermediate power between that of the writing pulse and that of the reading pulse was irradiated onto the recording track, except for the recording sites.

Figure 7:
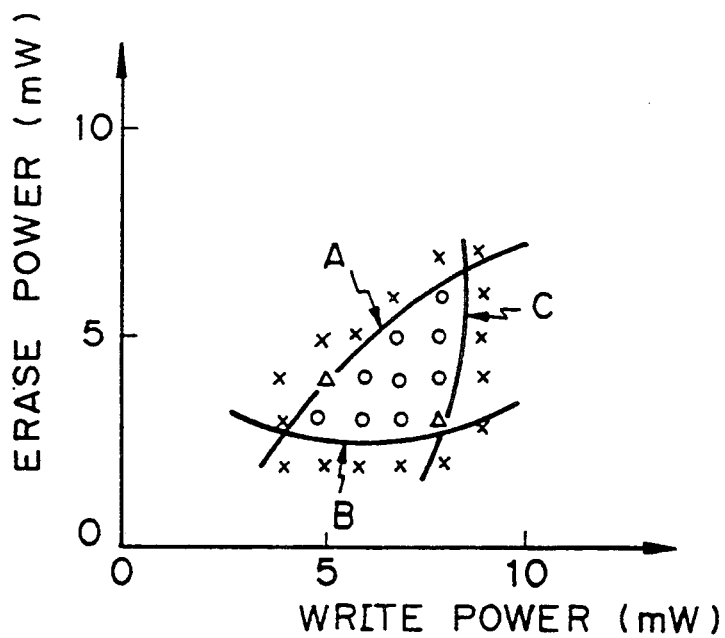
FIG. 7 is a graph of the ability to repeat overwriting of the overwriting mechanism in FIG. 6.

The result of this overwriting method is plotted in FIG. 7, which is a graph showing the relationship between the write power and the erase power. As seen at the left upper side area of line A, the erasing power was higher than the recording or writing power, and accordingly, writing could not be carried out after the erasure. At the lower side area of line B, generally an erasure could not be achieved as the erasure power was too small. Moreover, at the right side area of line C, erasing could not be carried out after writing, because the writing power was higher than the erasing power. More particularly, it is considered that, in the left upper side area of line A, the signal quality is reduced because the erasing power was too high and exceeded the power usually necessary to carry out erasing. Such a high erasing power causes magnetization in different directions after completion of the erasing, thereby leaving portions in which the magnetization directions are the same as those for the recording or writing. In the lower side area of line B, erasing, i.e., reversal of the magnetic field, could not be ensured due to a low power. In the right side area of line C, unreversed portions were left due to the large size of the magnetic domains, and thus these portions were not completely erased.

The results of FIG. 7 show that a simple and high-speed overwriting can be obtained if a specific writing power is adopted and a continuous beam or light having an erasing capability and having a power weaker than the writing power but stronger than the reading power, is used in areas other than the writing sites.

Next, overwriting was carried out under conditions derived from the results of FIG. 7, wherein the power of the writing pulsed beam was 7 mW, the power of the reading beam was 1 mW, and the power of the erasing beam was 4 mW, respectively. The erasing beam was irradiated to fill in the gaps between the writing sites, and a stable overwriting was continuously carried out.

EXAMPLE 3

This is an example of the overwrite method shown in FIG. 8.

A cleaned and grooved glass substrate was sputtered to form a recording layer of $Tb_{24}Fe_{68}Co_8$ having a thickness of 100 nm.

Information was recorded or written in the initialized magneto-optical disk under the following conditions: distance between magnetic domains—2 μm; no outer magnetic field; rotation speed of disk—10 m/sec; writing power—5 mW. A C/N ratio of 43 dB was obtained.

Then, overwriting was performed on the information written in the above step. A first step of the overwriting, as shown in the line ($D_1$) of FIG. 8 was carried out, together with erasing. First, short laser pulses E having a pulse width (magnetic domain length) of 0.2 μm as the erasing pulse were repeatedly and continuously irradiated along the track of the recording layer, and then, in the second step of the overwriting, new information was written as shown in by the line ($D_2$) in FIG. 8 in which W indicates a pulsed beam for writing. The overwriting conditions were as follows: a magnetic domain size 1 μm and a distance between pits 3 μm. A satisfactory overwriting was obtained with good results, i.e., a C/N ratio of 45 dB and an attenuation of magnetic domain signals (as above, a magnetic domain length or distance of 2 μm) of −40 dB.

The above results were plotted to obtain a graph showing the relationship between the write power and the C/N ratio. The graph is substantially the same as that of FIG. 5.

EXAMPLE 4

This is an example of the overwrite method shown in FIG. 9.

A cleaned and grooved glass substrate was sputtered to form a recording layer of $Tb_{24}Fe_{68}Co_8$ having a thickness of 100 nm. A protective overcoat of $Si_3N_4$ was then deposited on the recording layer.

Recording was carried out in accordance with the procedure described in Example 3, followed by overwriting on the information written in the above step. In a first step of the overwriting method, as shown by the line ($D_1$) in FIG. 9, a continuous beam of light E having an intermediate power between that of the writing pulse and that of the reading pulse was irradiated onto the recording track to completely erase the written information. Then after the erasing, in a second step of the overwriting method, new information was written as shown in the line ($D_2$) of FIG. 9, in which W indicates a pulsed beam for writing. The conditions for the overwriting were as follows: magnetic domain size—1 μm, and distance between magnetic domains 3 μm. A satisfactory overwriting was obtained.

The results were plotted to obtain a graph showing the relationship between the write power vs. erase power. The resulting graph is substantially the same as that of FIG. 7.

Next, an overwriting method was carried out under the conditions derived from the above results. The power of the writing pulsed beam was 7 mW, the power of the reading beam was 1 mW, and the power of the erasing beam was 4 mW. The erasing beam was irradiated to fill in the gaps between the writing sites, and a stable overwriting operation was continuously carried out.

EXAMPLE 5

This is an example of the overwrite method shown in FIG. 4.

A cleaned and grooved glass substrate was sputtered to form a recording layer of $Gd_{0.25}Fe_{0.70}Co_{0.05}$ having a thickness of 100 nm.

Figure 13A:
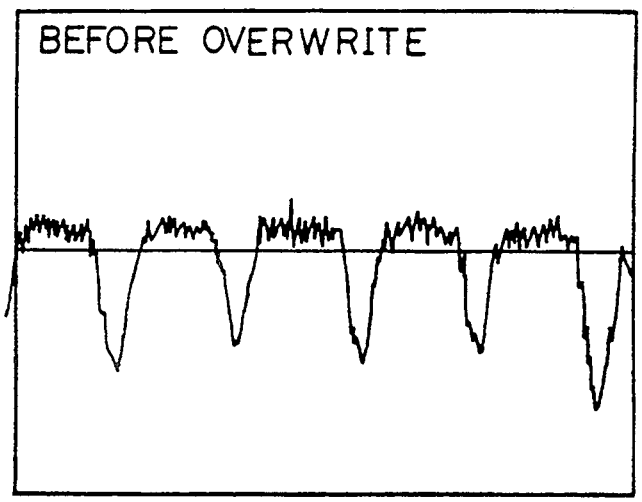
FIGS. 13A to 13C are schematic views of patterns of the recorded information before and after overwriting.

Information was recorded or written in the initialized magneto-optical disk under the following conditions: distance between pits—2 μm, no outer magnetic field; rotation speed of disk—3 m/sec; writing power—5 mW; and frequency of writing pulse—0.5 MHz. The written information was then read and recorded in an oscillograph. A patterned pulse as shown in FIG. 13A was obtained.

Figure 13B:
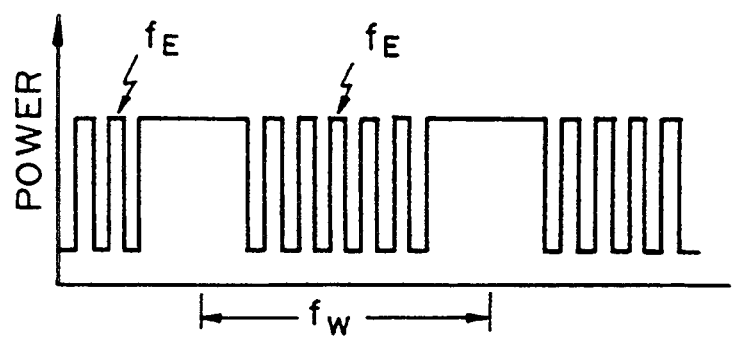
Figure 13C:
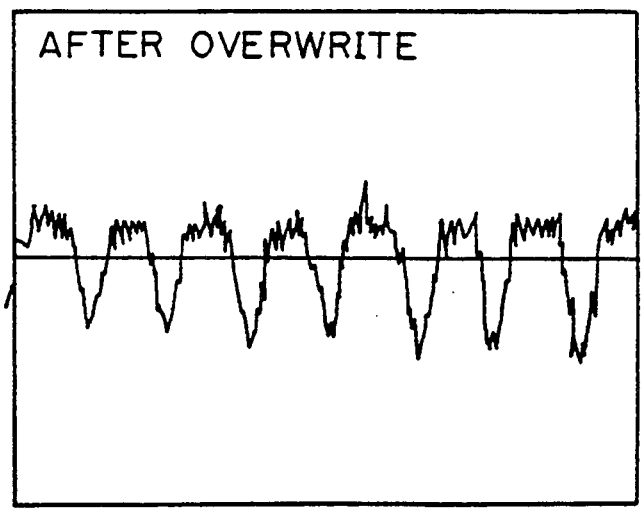

Next, an overwriting method was carried out on the information-carrying track in accordance with the overwrite schedule in FIG. 13B, in which the $f_W$ was 0.8 MHz, and the $f_E$ was 5 MHz. The writing power and erasing power were both 5 mW. After the disk was rotated once, the rewritten information was read and recorded in an oscillograph, and a patterned pulse as shown in FIG. 13C was obtained. The pattern of FIG. 13C shows that the signals of 0.5 MHz (FIG. 13A) were erased and were replaced by new signals of 0.8 MHz recorded on the same track.

EXAMPLE 6

The procedure of Example 5 was repeated to ascertain changes in the error rate after overwriting and changes in the C/N ratio and changes in the error rate with an increase of number of overwrite operations.

Figure 14:
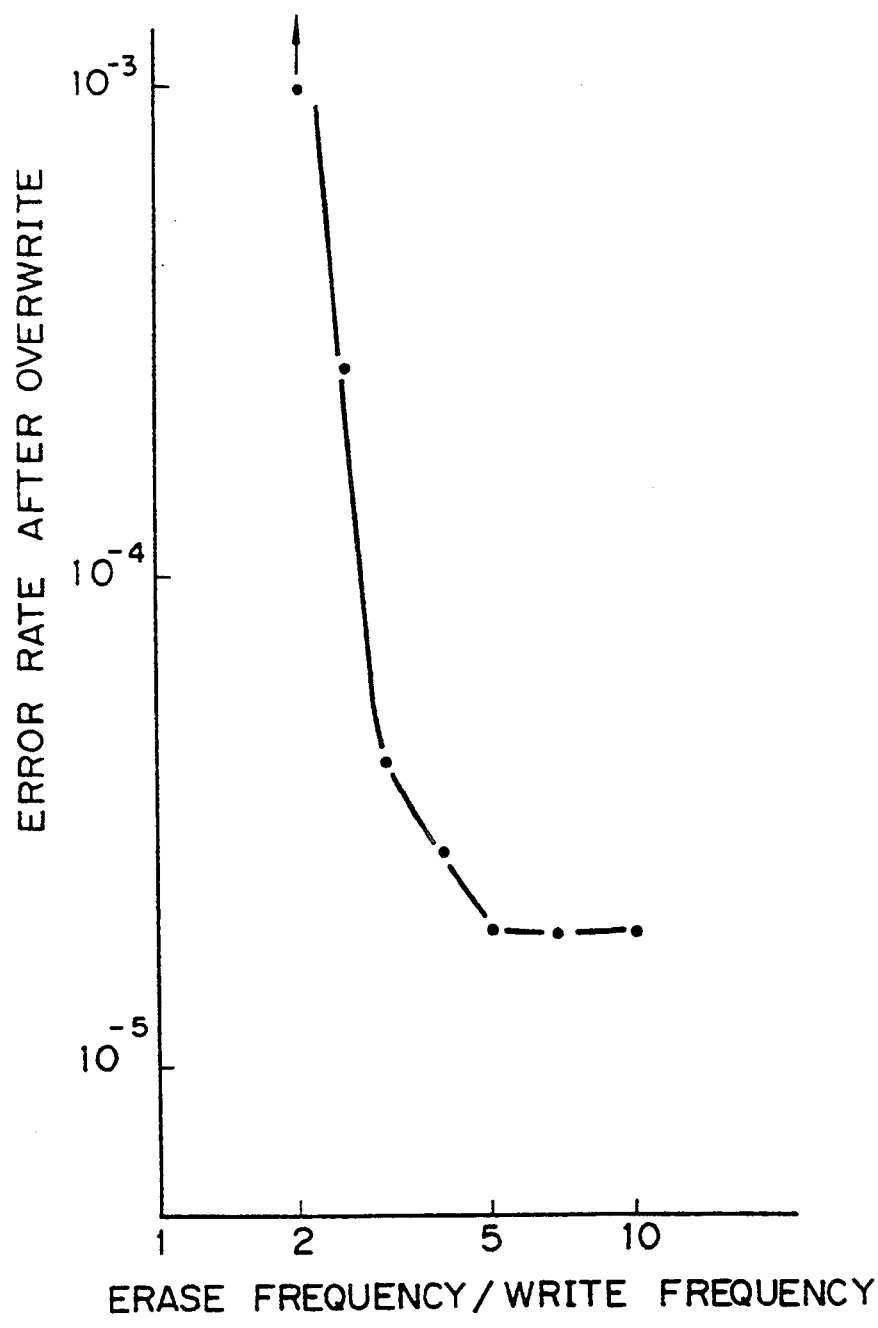
FIG. 14 is a graph of an error rate after overwriting.

First, the procedure of Example 5 was repeated using erasing pulses having different frequencies. The frequency of the writing pulse was 0.8 MHz, and the frequencies of the erasing pulses were 1.6, 2.0, 2.4, 4.0, 5.0, and 8.0 MHz. The results for the error rate after overwriting are plotted in FIG. 14. This graph shows that a relatively low error rate was obtained when the ratio of erase frequency/write frequency was 3 or more, and particularly, the error rate was saturated when the ratio was 5 times or more. It is considered that, when the ratio is 5 times or more, the resulting defects in the recording medium can affect such an error rate.

Figure 15:
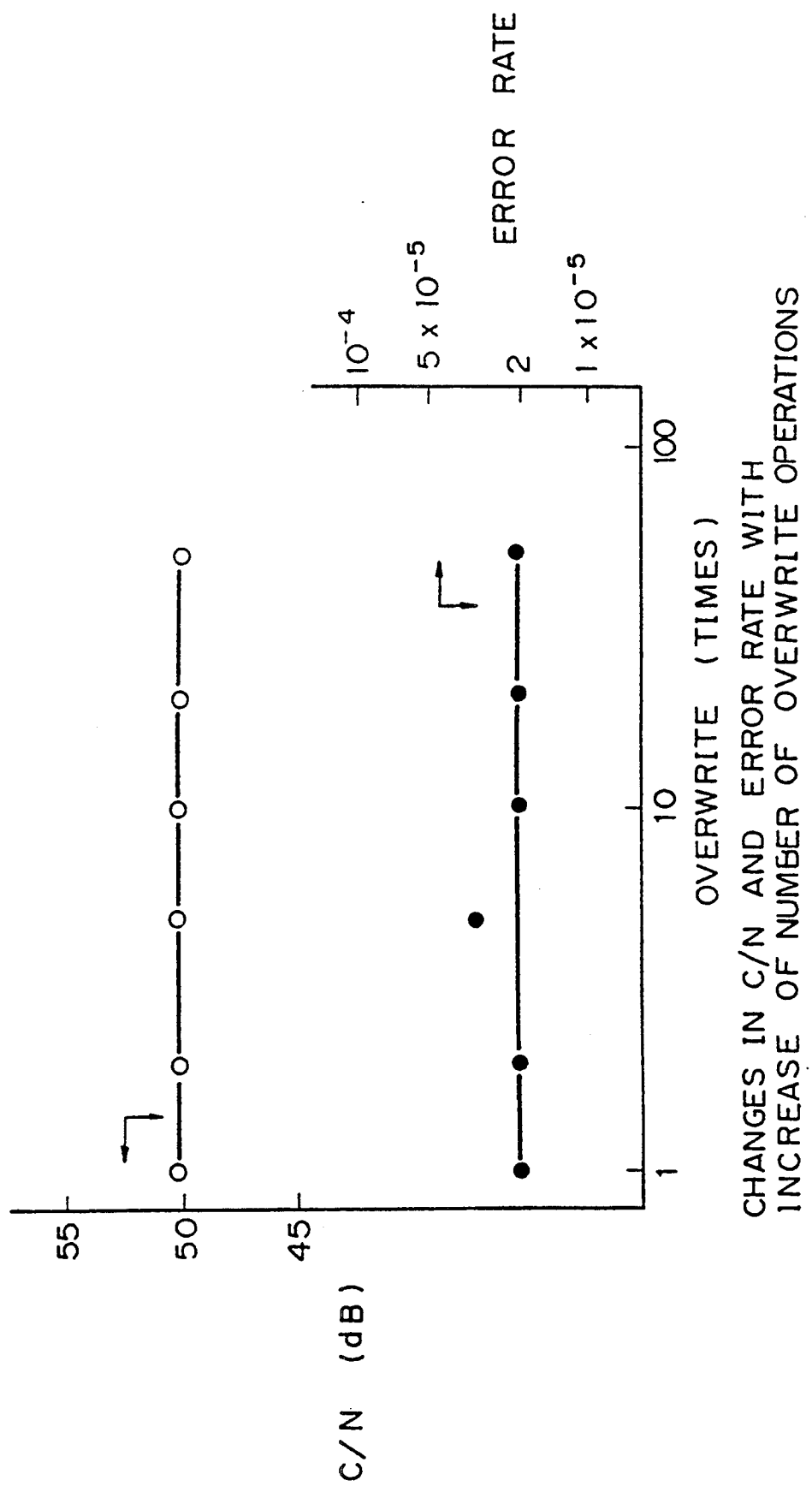
FIG. 15 is a graph showing changes in a C/N and error rate with an increase of the number of overwriting operations.

At an erase frequency/write frequency ratio of 5, the C/N ratio and error rate due to an increase of the number of overwrite operations was determined to ascertain the influence of such an increase on the C/N ratio and error rate. The results are plotted in FIG. 15, which shows that no changes in the C/N ratio and error rate occurred during 50 overwriting operations.

We claim:

1. A method for overwriting information in a magneto-optical memory layer, comprising the steps of:

a) providing a magneto-optical memory substrate with the magneto-optical recording layer having a perpendicular magnetization direction characteristic coated thereon, the magneto-optical recording layer having information tracks, each of which carries previously selectively recorded magnetic domains;

b) providing a first optical system including a first laser and an object lens for irradiating the magneto-optical recording layer with an erasing light beam, and a second optical system including a second laser and the object lens for irradiating the magneto-optical recording layer with a writing light beam;

c) irradiating the erasing light beam onto one information track of the information tracks, regardless of the presence or absence of written information in the information tracks, the erasing light beam having a power sufficient to erase the written information but not sufficient for writing information in the information track; and d) selectively irradiating the writing light beam in accordance with information to be overwritten into the erased information track of the information tracks, the writing light beam having a power sufficient for writing information into the information track, the erasing and writing light beams being focused through the objective lens on the information tracks closely adjacent to each other such that a distance between light beam spots formed on the information track by the erasing and writing light beams is approximately 10 $\mu$m to 50 $\mu$m.

2. A method according to claim 1, wherein the erasing light beam comprises first pulses having a frequency higher than that of the writing light beam.

3. A method according to claim 2, wherein the frequency of the erasing light beam is 3 times or more higher than a maximum frequency of the writing light beam.

4. A method according to claim 1, wherein in said steps a) and b) the information is "0" and "1" binary signal information.

5. A method according to claim 1, wherein the erasing light beam is a series of pulses, each of the series of pulses having a pulse width narrower than that of the writing light beam.

6. A method according to claim 5, wherein a height of the erasing light beam is lower than a height of the writing light beam.

7. A method according to claim 5, wherein a height of the erasing light beam is the same as the height of the writing light beam.

8. A method according to claim 1, wherein in said step a) the erasing light beam is a continuous laser beam having a power stronger than that of a reading beam and sufficient to erase written information, but not sufficient for performing a writing operation.

9. A method according to claim 1, wherein said steps a) and b) are carried out in the presence of an auxiliary magnetic field.

10. A method according to claim 1, wherein the magneto-optical memory medium comprises a disk.

* * * * *

UNITED STATES PATENT AND TRADEMARK OFFICE
CERTIFICATE OF CORRECTION

PATENT NO. : 5,353,265
DATED : October 4, 1994
INVENTOR(S) : MAEDA, et al.

It is certified that error appears in the above-indentified patent and that said Letters Patent is hereby corrected as shown below:

Col. 5, line 18, change "information an" to --information. An--.

Col. 6, line 14, change "pits" to --magnetic domains--.

Col. 7, line 20, delete "10".

Col. 11, line 36, delete "in" (first occurrence).

Signed and Sealed this

Seventh Day of February, 1995

Attest:

BRUCE LEHMAN

*Attesting Officer*  *Commissioner of Patents and Trademarks*